No. 607,802. Patented July 19, 1898.
W. KORTÜM.
DEVICE FOR STERILIZING MILK, &c.
(Application filed Nov. 30, 1896.)

(No Model.) 3 Sheets—Sheet 1.

Witnesses:
F. Schnur.
Ph. Müller

Inventor
Wilhelm Kortüm
per Enrique Witte,
Attorney

THE NORRIS PETERS CO., PHOTO-LITHO., WASHINGTON, D. C.

No. 607,802. Patented July 19, 1898.
W. KORTÜM.
DEVICE FOR STERILIZING MILK, &c.
(Application filed Nov. 30, 1896.)
(No Model.) 3 Sheets—Sheet 2.
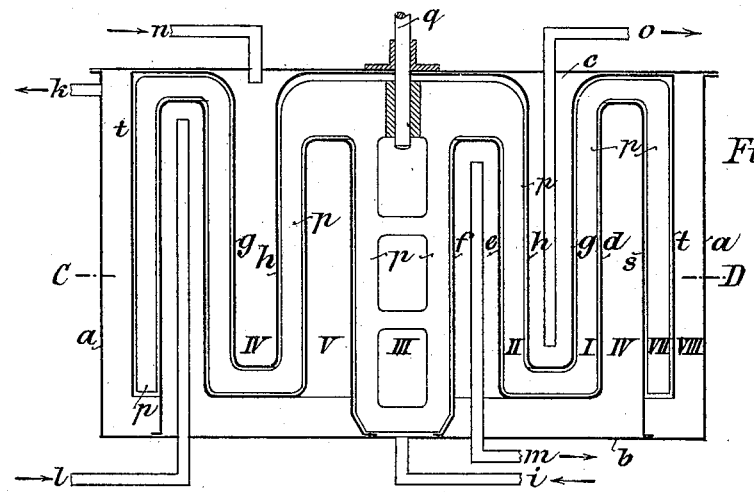
Fig. 5.
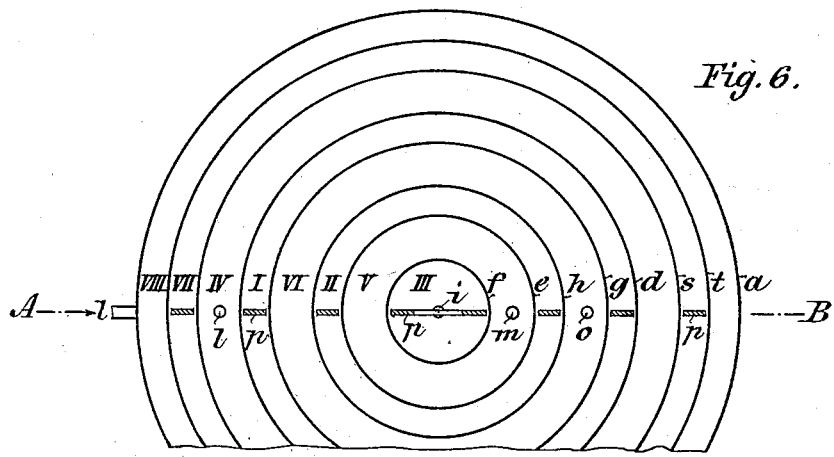
Fig. 6.
Fig. 7.
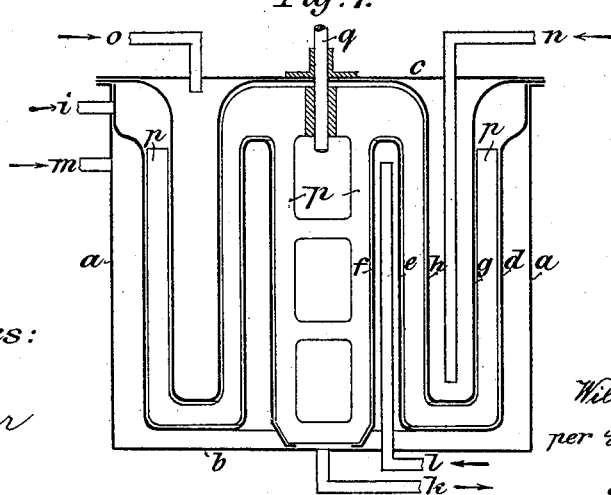
Witnesses:
F. Schnur.
Ph. Müller
Inventor
Wilhelm Kortüm
per Enrique Witte
Attorney No. 607,802. Patented July 19, 1898.
W. KORTÜM.
DEVICE FOR STERILIZING MILK, &c.
(Application filed Nov. 30, 1896.)
(No Model.) 3 Sheets—Sheet 3.
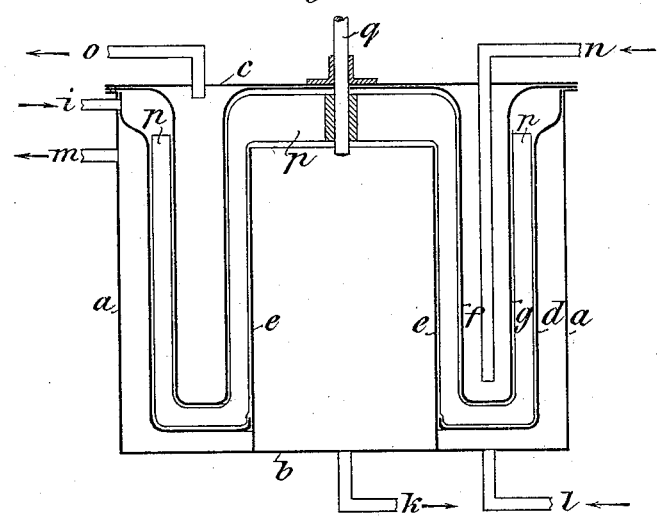
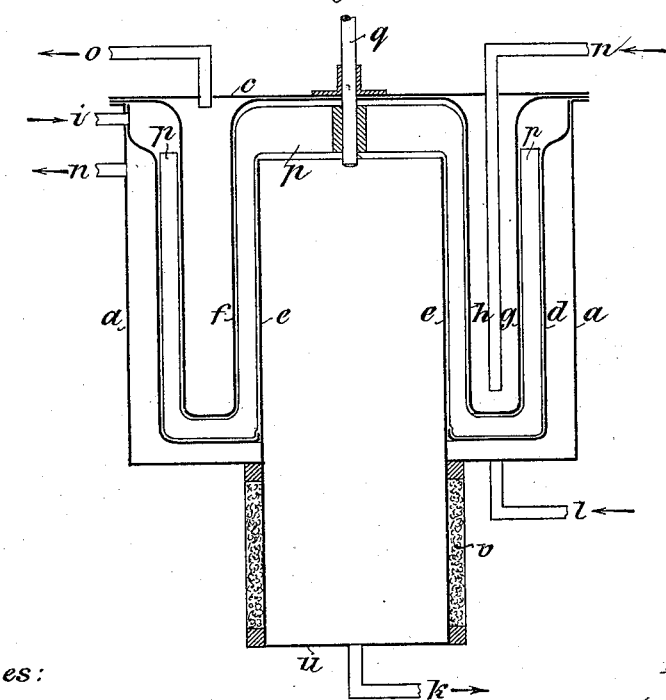
Witnesses:
F. Schnur.
Ph. Müller
Inventor
Wilhelm Kortüm
per Enrique Witte,
Attorney

UNITED STATES PATENT OFFICE.

WILHELM KORTÜM, OF BERLIN, GERMANY.

DEVICE FOR STERILIZING MILK, &c.

SPECIFICATION forming part of Letters Patent No. 607,802, dated July 19, 1898.

Application filed November 30, 1896. Serial No. 613,965. (No model.)

*To all whom it may concern:*

Be it known that I, WILHELM KORTÜM, a subject of the German Emperor, residing at Berlin, in the Kingdom of Prussia, Germany, have invented certain new and useful Improvements in Devices for Sterilizing Milk and other Liquids, of which the following is a specification.

My invention relates to devices for sterilizing milk and other liquids; and the objects of my invention are, first, to provide an apparatus through which the milk flows continuously in thin layers and in close contact with heating-surfaces; second, to impart to the liquid passing through the apparatus a rotary movement to prevent any depositions and burning of the same, and, third, to provide within the apparatus a chamber through which the liquid flows slowly toward the outlet and is kept for some while at its raised temperature for the purpose of attaining a homogeneous boiled product. I attain these objects by the apparatus represented in the accompanying drawings, in which—

Figure 1:
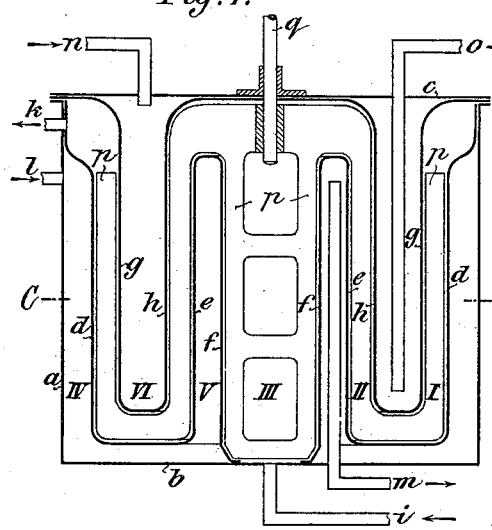
Figure 3:
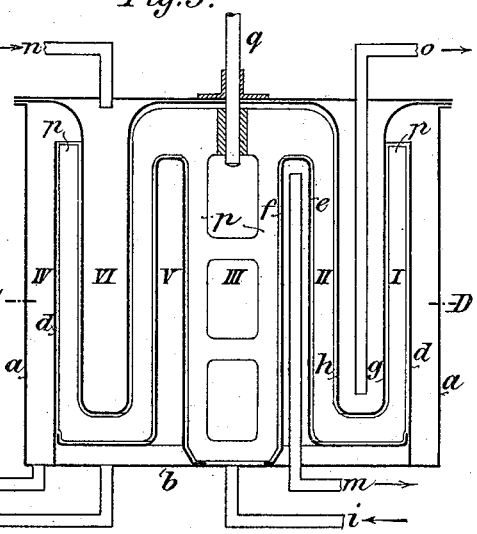
Figure 2:
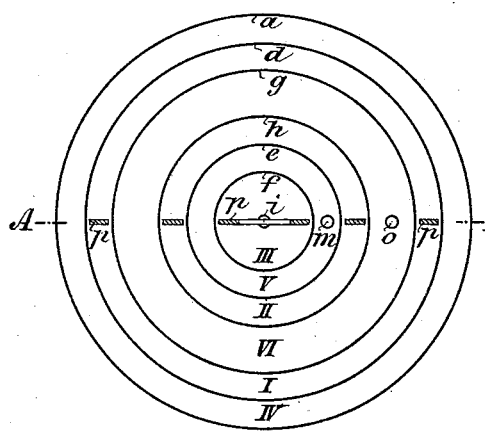
Figure 4:
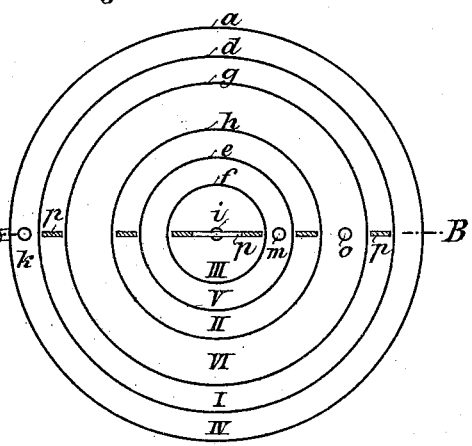

Figure 1 is a vertical section on the line A B, Fig. 2; Fig. 2, a horizontal section on the line C D, Fig. 1; Figs. 3 and 4, similar sections of a modification of my invention, corresponding to Figs. 1 and 2, respectively; Figs. 5 and 6, similar sections of another modification of my invention; Figs. 7, 8 and 9, vertical sections of further modifications of my invention.

In the apparatus represented in Figs. 1 and 2, $a$ is a cylindrical casing of suitable material, provided with a bottom plate $b$ and a detachable cover-plate $c$. The casing $a$ contains a system of cylindrical partitions $d\ e\ f$, concentrically connected together, the outer partition $d$ being steam-tightly secured at its upper end to the casing $a$ and the inner partition $f$ connected at its lower end to the bottom plate $b$ and forming a middle chamber III. A similar system of partitions $g\ h$, connected together at their lower ends, is secured to the cover-plate $c$ and projects into the annular space between the partitions $d\ e$, leaving clear spaces I II for the passage of the liquid to be heated. The same enters through $i$ the middle space III. It then passes in a zigzag way through spaces II and I, forming a thin layer corresponding to the small space between the partitions $e\ h\ g\ d$. The heating medium—as steam, hot water, &c.—is admitted through the pipe $l$ into the hollow space IV V between the casing $a$ and the partitions $d\ e\ f$ and is discharged by the pipe $m$. The chamber VI, formed by the partitions $g\ h$, is supplied with steam or another heating medium through a pipe $n$, $o$ being the discharging-pipe. By these means the liquid passes between heated surfaces and is discharged by a pipe $k$ after having been raised to the required degree of heat. A stirring device consisting of bent arms $p$, nearly filling the spaces III II I and projecting from a shaft $q$, is provided in the middle of the apparatus and kept in rotary movement by any suitable means, so as to impart a similar movement to the liquid passing through the same spaces.

In the modification represented in Figs. 3 and 4 the outmost partition $d$ projects freely and extends downward to the bottom plate $b$. By these means space IV between the partitions $a$ and $d$ communicates with the annular space I, passed through by the hot milk, space IV thus forming the above-mentioned chamber for the liquid, in which the same descends to the discharging-pipe $k$ without being agitated by the arms $p$ of the stirring device, not reaching the chamber IV, and without being further heated, so as to be kept for some while at its raised temperature. $l$ and $n$ are supply-pipes, and $m$ and $o$ are discharging-pipes for the heating medium, as before described.

In the modification of my invention represented in Figs. 5 and 6 another partition $t$ is provided, projecting downward from the cover-plate $c$, so as to form two annular spaces VII VIII, and the stirring-arms are prolonged to fill the space VII. Space IV is used again for heating purposes, as before described with reference to Fig. 1, and space VIII forms the above-mentioned chamber for keeping the milk for some while at its raised temperature and in a quiet condition before it leaves the apparatus by the discharging-pipe $k$ at the top of the casing $a$. The modification of Fig. 7 does not differ from that represented in Fig. 1 as concerning the construction, but is intended to be used in an inverted order. The liquid to be heated enters at $i$ in the upper part of the apparatus and at its outer periphery and leaves the same by pipe *k* at the middle of its bottom. The heating medium flows likewise invertedly through the heating-chambers, entering through pipe *l* and being discharged by pipe *m*.

In the modification represented in Fig. 8 the flow of the liquid to be heated and of the heating medium is the same as in the modification of Fig. 7, the only difference from that figure consisting in that the innermost partition *f* and the corresponding part of the stirring-arms are omitted and partition *e* extends downward to the bottom *b*, closing the inside of the heating-chamber formed by the partition *d* and the casing *a*. Supply-pipe *l* discharges accordingly into the latter chamber.

Fig. 9 represents a modification of Fig. 8, in which the partition *e* extends through the bottom plate *b* and is closed by a bottom plate *u*, provided with the discharging-pipe *k*. The projecting part of partition *e* is inclosed by a jacket *v* for preventing loss of heat.

Having now described the nature of my invention, I now proceed to explain the method of operating the same.

The milk or other liquid to be sterilized enters through *i* into the apparatus, flows through the continuous spaces formed by the partitions *d e f g h s* within the vessel *a b c*, and is discharged through *k*, while at the same time the heating medium enters in opposite direction by *l* and *n* and leaves the apparatus by *m* and *o*, heating the same and transmitting the heat to the liquid to be heated. The milk flowing up and down through the apparatus is contained in the spaces formed by two heating-partitions or by a heating-partition and a separating-partition and agitated by the stirring-arms *p*, striking the spaces, whereby burning from the heated partitions is prevented. In the spaces formed by a mere separating-partition or by such a partition and the casing *a* the liquid is not agitated, these spaces serving only for keeping the liquid for a certain time at its raised temperature during its slow flow toward the outlet for the purpose heretofore described.

Although I have shown and described my invention provided with cylindrical partitions, it may be observed that the partitions may be arranged in a conical form without departing from my invention.

It will be obvious that my invention may also be used for cooling liquids by passing a cooling medium through the apparatus instead of a heating medium, the construction of the apparatus not being subjected to any alteration, and the apparatus used for cooling purposes forming likewise a part of my invention.

What I claim, and desire to secure by Letters Patent, is—

In an apparatus for heating milk and other liquids under pressure, the combination of an outer cylindrical vessel, partitions concentrically arranged in said vessel and alternately connected at their top and bottom, of a detachable cover provided with depending hollow concentrically-arranged partitions, said partitions adapted to fit within the spaces between the partitions of the cylindrical vessel, thereby forming a series of communicating annular chambers adapted to receive the material to be treated, and a stirring device located in said annular chambers, substantially as described.

In witness whereof I have hereunto signed my name in the presence of two subscribing witnesses.

WILHELM KORTÜM.

Witnesses:
W. HAUPT,
HENRY HASPER.